Patented Jan. 15, 1946

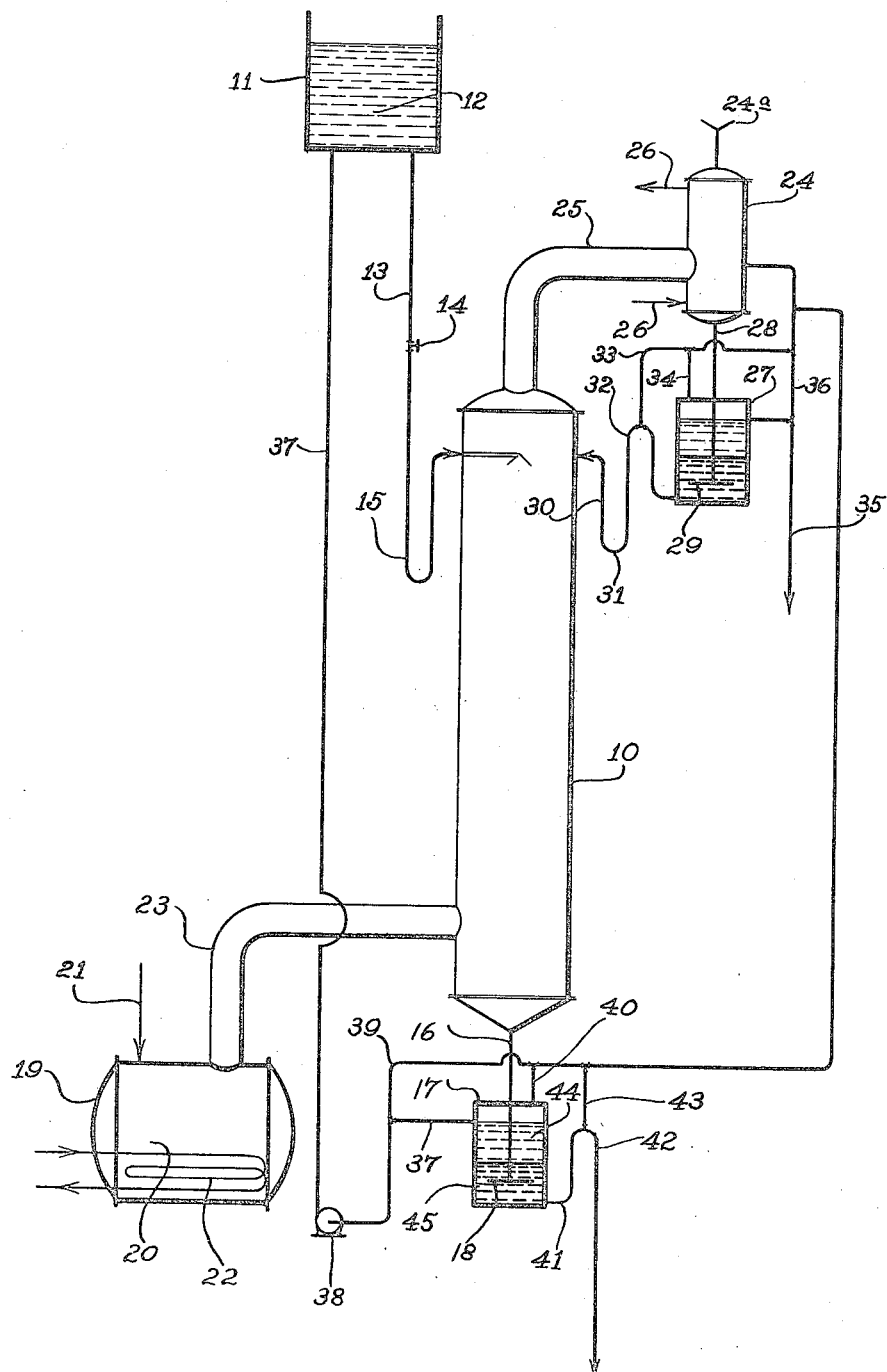

2,393,108

UNITED STATES PATENT OFFICE 2,393,108

ANHYDROUS CAUSTIC ALKALIS AND METHOD OF PREPARING SAME

Vaman R. Kokatnur, New York, N. Y., assignor to Autoxygen, Inc., New York, N. Y., a corporation of New York Application August 17, 1940, Serial No. 353,061

8 Claims. (Cl. 23—302)

This invention relates to anhydrous caustic alkalis and to a method of preparing such material.

One of the objects of the invention is to provide anhydrous caustic alkalis in finely divided crystalline form.

Still another object of the invention is to provide an anhydrous caustic alkali having greater purity than is attainable with the pot fusion practice.

Another object of the invention is to provide an anhydrous caustic alkali having greater reactive characteristics than that heretofore produced.

Another object of the invention is to provide an anhydrous caustic alkali in finely divided crystalline form which has greater stability than any such material heretofore produced.

A further object of the invention is to provide freely flowing anhydrous particles of caustic alkali, each of which is coated with a material inert to the caustic and immiscible with water.

Another object of the invention is to provide a method of preparing caustic alkalis in a more economical and less hazardous way than has been possible by the usual process of pot boiling or fusion, and without the production of caustic bottoms which have to be retreated.

A further object of the invention is to provide a process for producing anhydrous caustic alkalis whereby lower temperatures may be used not exceeding 440° F.

Still another object of the invention is to provide a process of manufacturing anhydrous caustic alkalis in finely divided crystalline form by means of which corrosion of the apparatus is inhibited.

A further object of the invention is to provide a process for producing solid caustic alkalis from caustic alkali solutions in which particles of the caustic alkali are coated as they are formed with a protective coating and immediately removed from the mother liquor so that the particles are not contaminated by the mother liquor.

Still another object of the invention is to provide a process for producing anhydrous caustic alkalis in finely divided crystalline form which may be carried on in ordinary distilling apparatus or in a column still in a continuous manner.

A further object of the invention is to provide a process of producing anhydrous caustic alkali from a dilute solution of said caustic alkali with use of an agent which aids in evaporating said dilute solution by partial pressure distillation and also separates and protects the anhydrous caustic from the mother liquor.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

The single figure of the drawing illustrates one embodiment of apparatus by which the continuous process of the invention may be carried out.

It has been the custom heretofore in the production of caustic alkalis to follow two general methods of producing the anhydrous product. Both methods start with a caustic solution which is either produced electrolytically or by a chemical process so that the solution contains water and about 8% to 12% of the hydroxide. For most commercial purposes these dilute solutions are then concentrated to 50% concentration in multiple effect evaporators to remove impurities of sodium chloride, sodium carbonate, iron, etc., and to reduce the cost of transportation by decreasing the volume of the solution.

According to the first general method of producing the anhydrous caustic, this 50% caustic liquor is placed in a fusion pot and heated to a temperature above the fusion point of the anhydrous caustic product, which for caustic soda is about 608° F. After treatment in the fusion pot the anhydrous material is removed for use.

The second general method involves precipitation of the anhydrous caustic from the mother liquor. Such precipitation occurs when the solution is in equilibrium with the anhydrous caustic. This equilibrium solution has a concentration of about 75% for caustic soda and 86% or over for caustic potash, and hence the 50% concentration liquor is heated to evaporate water and bring it to a 75% concentration for caustic soda or an 86% concentration for caustic potash, after which further concentration of the liquor will supersaturate the liquor and precipitate the anhydrous caustic, while the mother liquor will remain at a constant equilibrium concentration.

Precipitation may also be effected by cooling caustic solutions of the equilibrium concentration, since the supersaturation of the liquor is produced at the cooler temperature. Following this procedure, care must be taken not to cool the liquor below the fusion point of the monohydrate, which, for caustic soda, is approximately 145° F. Thus the temperature during precipitation is kept above 145° F. but not above the temperature at which the caustic will remain in solution.

The present invention is based primarily on this precipitation method of producing the anhydrous caustic and provides an improvement thereover. The invention contemplates the continuous evaporation of the solution, thus precipitating anhydrous crystals of the product, but always maintaining some of the mother liquor, and thus the process may be made continuous by adding additional liquor, either continuously or from time to time, and withdrawing the precipitated crystals in like manner.

In the case of caustic soda it has sometimes been found advantageous to keep the temperature constant at a point between 280° and 400° F., either by use of vacuum alone, partial pressure evaporation alone, or by a combination of vacuum and partial pressure evaporation. In either case the evaporation of the solution is carried only to about 75% concentration. At this concentration anhydrous crystals of caustic soda are precipitated, provided the temperature is above 145° F. and below the fusion point of sodium hydroxide, since at this concentration anhydrous crystals of caustic soda are in equilibrium with the solution. It is, however, difficult to separate the anhydrous crystals from the mother liquor without contamination. Isolation becomes possible only when the filtration or centrifuging is accomplished at the temperature at which the mother liquor is in equilibrium with the crystals. Even in such case a small amount of contamination does take place, since washing is impracticable at this temperature.

I have found that the difficulty of isolation and separation of anhydrous crystals from the mother liquor may be accomplished by coating the crystals as they are precipitated with an oily, water immiscible, inert compound, which is preferably a liquid at the temperature of evaporation, and which is substantially non-reactive at the said temperature with the mother liquor or the caustic.

Various materials such as kerosene, gas oil, paraffin oil, paraffin wax, high boiling white mineral oils, diphenyl, etc. have been tried for the purpose of coating the anhydrous crystals. These materials have been found unsatisfactory for the reason that the anhydrous crystals when precipitated are surface wet with the mother liquor and such surface wet materials resist coating by oil film, or if such film is formed upon the crystals it is not suitable and breaks with slight disturbance. Another reason why these coating materials are unsatisfactory is because they are lighter than water and considerably lighter than the heavy caustic alkali solutions, such as the mother liquor, which has a specific gravity of 1.6 to 1.7. These oils, therefore, have a strong tendency to pull off from the crystals and float on the surface of the mother liquor.

The only compounds suitable for the purpose of this invention to isolate anhydrous crystals continuously from the mother liquor are those which have the following characteristics: They must be substantially inert to the caustic alkali solution and to the anhydrous caustic; they must be immiscible in water; they must have a specific gravity at least as great as the mother liquor and preferably greater, at the concentration and temperature at which precipitation occurs; and for the continuous process they must be volatile at such temperature and liquid at the discharging temperature.

Among such compounds are the organic halogen compounds, especially those of the aromatic series. Aliphatic halogen compounds, being reactive with caustic are not suitable, whereas aromatic halogen compounds, being substantially non-reactive are ideally suited to carry out the invention.

Among these compounds may be mentioned tetrachlorbenzene, pentachlorbenzene, hexachlorbenzene, dichlornaphthalene, trichlornaphthalene, and bromine derivatives of diphenyl, diphenylmethane and other aromatic hydrocarbons of single or multiple rings.

All nitro compounds of suitable density and boiling point which are non-reactive to the caustic, as well as certain metal organic compounds, also meet the qualifications for use with the process. These include diisobutylmercury, dipropylmercury, potassiumxanthogenate, dipropyltindiodide, paradinitrobenzene, mononitrobenzene, and nitrotoluene.

In carrying out my process, either with separate batches of the material or continuously, I may prefer to use the principle of partial pressure distillation for further increasing the concentration of the caustic solution. By this I mean that the vapor pressures of water and the coating material which is added are sufficient together to overcome the external vapor pressure permitting the water to vaporize at temperatures under those normally required. As distillation takes place the water is driven off together with a portion of the coating material. This of course is carried out only until the concentration of the caustic liquor reaches approximately the equilibrium point.

One form of apparatus for the continuous process of the invention is illustrated in the figure in which a standard column still 10 is shown, provided with the usual internal plates or packing to cause the caustic solution to travel down through the still in a tortuous path and heat-insulated on the outside with suitable insulating material. A container 11 for the caustic solution 12, adjacent the upper end of the still, is connected to the still by means of a pipe 13 provided with a petcock 14 to control the flow of the solution into the still, a downwardly extending loop 15 being provided to act as a trap to prevent gases from passing up into the supply of caustic solution. At the lowermost point in the still a pipe 16 discharges into a closed container 17, the pipe terminating in a suitable distributing T connection 18.

I provide another vessel 19 adjacent the lower end of the still for containing the coating material or diluent 20. This vessel is fed through the pipe 21 and is provided with a heater 22, shown in this instance as a coil of pipe with suitable steam connections for passing steam through the coil. A large diameter pipe 23 leads from the top of the vessel 19 to the lower end of the still at a point slightly above the bottom thereof.

Above the top of the still I provide a condenser 24 which is connected to the top of the still by means of a large diameter pipe 25, and which may be cooled in any desirable manner, as for instance, by a flow of water into and out of the condenser through the pipes 26. A container 27 is provided below the condenser 24 to receive the distillate, and pipe 28, leading from the condenser to the container 27, terminates near the bottom of the latter in a suitable distributing T connection 29. A pipe 30 connects the bottom of the container 27 with the still, and this pipe is provided with a downwardly extending loop 31 to act as a trap for preventing the gases from the still from passing out through the pipe 30. The pipe 30 is also provided with an upwardly extending loop 32, the upper end of which is about on a level with a plane about one-third of the distance down from the top of the container 27 and is vented into the condenser by means of a pipe 33, so as to permit liquid to flow from the container 27 into the still, when the level of the liquid in the container has risen sufficiently. The container 27 is also vented by means of a pipe 34 which joins the pipe 33 connected to the condenser. The condenser itself is also vented at 24ª.

Another outlet pipe 35 is connected to the container 27 at a point slightly above the level of the top of the loop 32 providing means to withdraw liquid rising above that level in the container. This pipe is also vented by means of a pipe 36 which joins the pipe 33 leading to the condenser 24.

The container 17 below the still is provided with two outlet pipes. One outlet pipe 37 is connected to the container 17 at a point about one-quarter down from the top thereof, and this pipe is connected through a pump 38 to the vessel 11 containing the caustic soda solution. The pipe 37 is vented at its highest point between the pump 38 and container 17 by means of the pipe 39 which leads up to the still as indicated. The container 17 is also vented by means of a pipe 40 which is connected to the pipe 39.

The other outlet pipe 41 is connected to the bottom of the container 17 and is provided with an upwardly extending loop 42, the upper end of which is slightly below the point where the pipe 37 is connected to the container 17, and this loop is vented by means of a pipe 43 which is connected to the pipe 39.

In the operation of the continuous process using the apparatus just described, a 50% caustic solution is placed in the vessel 11 and the solution is allowed to flow into the upper end of the still 10. The coating material or diluent 20 is fed into the lower vessel 19 and heated by means of the heater 22. The temperature of the coating material is raised sufficiently to vaporize the liquid, and the vapor passes up through the pipe 23 to the lower end of the still, and then through the still and up into the condenser 24 through the pipe 25.

It will be seen that as the caustic liquor travels down through the still it comes in contact with the hot rising vapor of the diluent and partial pressure distillation begins to take place. The rate of flow of the caustic solution is adjusted so that the concentration of the caustic increases as it passes downwardly in the still until it has reached the equilibrium concentration at or near the bottom.

Some of the diluent vapor naturally condenses in the still and runs down to the bottom with the caustic solution. A portion of it together with the water vapor passes into the condenser 24 through the pipe 25 and is condensed by contact with the cooling means. The liquified diluent and water run down through the pipe 28 into the container 27, and as the diluent is heavier than water, it sinks to the bottom pushing the water to the top. As the two liquids rise in the container 27 the diluent will flow out through the pipe 30 back into the still and find its way to the bottom, while the water is drawn off through the pipe 35.

Because both the coating material and water are in the container 27, the weight of a column of the liquid therein will be less than an equal-length column of the coating material alone. Hence it is necessary to arrange the top of the loop 32 in the pipe 30 so that it will be slightly below the water outlet 35, to insure flow of the coating material back into the still.

The caustic solution and the diluent will collect at the bottom of the still and flow into the container 17, and since the diluent is heavier than the caustic solution, the two liquids will separate, the caustic solution rising to the top, as indicated at 44, while the heavier diluent collects below, as at 45. The container 17 is naturally cooler than the still and as the equilibrium caustic solution is cooled by passing into it, precipitation of the anhydrous crystals occurs, the crystals immediately falling to the bottom and becoming coated with the coating material.

When the level of the liquid in the container 17 reaches the pipe 37, the caustic solution 44 at the top will flow into the pump 38 and be returned to the tank 11, and at this level the diluent or coating material 45 will flow out through the pipe 41 and carry the coated crystals of caustic material with it. The coating material is then removed from the crystals to the extent desired by means of a solvent as already explained.

The flow through the pipes 30, 35, 37, and 41 is controlled so that the liquid levels in containers 27 and 17 remain about as indicated in the drawing.

With the form of apparatus shown for producing the continuous process, a diluent or coating liquid should be chosen which has a vapor pressure sufficient to produce the partial pressure distillation, as the hot vapors of the diluent travel upwardly and the caustic solution travels downwardly in the still. Also, a diluent should be chosen which is vaporizable at temperatures below the fusion point of the caustic and above the fusion point of the monohydrate, as already explained, and which is a liquid at the cooler temperatures of the mother liquor as precipitation occurs.

While the diluent or coating material is preferably inert to the caustic alkali, a slight amount of reaction between the two may be tolerated. Any reaction, however, between the two will reduce the efficiency of the process so that less of the anhydrous caustic material is produced and the stability is also impaired.

The following examples are given to illustrate specific instances of the process of the invention.

EXAMPLE 1

The 50% caustic soda liquor is concentrated in a vacuum still to a concentration of approximately 75%. At this point it is mixed with 100 parts of pentachlorbenzene to each 100 parts of the caustic liquor. The evaporation is then continued with agitation, keeping the temperature constant at approximately 280° F. with a vacuum maintained at 28" of mercury. The precipitation occurs progressively as the evaporation takes place.

The precipitated, coated, and protected crystals, covered with the coating agent, may be progressively or intermittently withdrawn and treated by a low boiling solvent of the diluent and a non-solvent of the caustic, and then dried. Suitable solvents are: petroleum ether, acetone, carbon tetrachloride, trichlorethylene, ethylenedichloride, benzene, benzine, solvent naphtha, gasoline, etc. Thus, pure crystals may be obtained free from mother liquor contaminations or the diluent contaminations.

The distillate will contain water and a small amount of the diluent, namely pentachlorbenzene, i. e., it will be substantially all water.

EXAMPLE 2.—PARTIAL PRESSURE EVAPORATION

A purified caustic soda solution of about 50% strength is evaporated in a still fitted with an agitator in contact with at least 100 parts of tetrachlorbenzene for each 100 parts of the caustic solution. The mixture is evaporated with agitation under a vacuum of from 22 to 28" of mercury, and as soon as the concentration of caustic reaches 75%, the anhydrous crystals will begin to appear, the temperature remaining substantially constant as long as the vacuum is maintained. The precipitated and precipitating crystals are immediately coated with the heavy oil diluent and protected from contamination of the mother liquor even after agitation is stopped. Since the mother liquor will form a top layer at the temperature of evaporation, crystals together with some of the diluent are withdrawn intermittently or continuously during which time more caustic is fed into the solution. Evaporation then takes place continuously as the fresh caustic solution reaches the point of precipitation.

The diluent is removed as in Example 1.

EXAMPLE 3.—PARTIAL PRESSURE EVAPORATION 100 parts of 50% solution of caustic soda, 50 parts of pentachlorbenzene, 50 to 75 parts of a hydrocarbon with a boiling range between 290° and 390° F. are mixed together in a still fitted with an agitator. The still is heated and the mixture is agitated, and distillation begins and is continued until the concentration of caustic reaches approximately 75%. The temperature, however, is not permitted to exceed much above 325° F. By the time that the caustic concentration has reached 75%, substantially 90% of the hydrocarbon diluent will be distilled over, leaving behind the high boiling and heavier pentachlorbenzene. Crystals of anhydrous caustic precipitated from this mixture will be coated with the pentachlorbenzene and will fall to the bottom. They are then withdrawn as in Example 1, either intermittently or continuously, and finished as desired.

*Caustic potash*

The evaporation of caustic potash, although analogous to that of caustic soda, differs slightly from it in temperature and equilibrium conditions for precipitation.

The equilibrium conditions for caustic potash, when anhydrous crystals will be precipitated, is a concentration of 86% or over. The limiting temperature of the monohydrate is about 295° F. During the precipitation of caustic potash, by supersaturating the 86% solution, the temperature should not exceed 540° F. Hence, during the evaporation, whether by distillation in vacuum or by partial pressure, these limiting temperatures should not be exceeded.

EXAMPLE 4

100 parts of 50% caustic potash solution is evaporated under 28" vacuum, to at least 86% caustic potash. The temperature should not exceed 530° F. At this point 100 parts of hexachlorbenzene is mixed with it and heating continued and the mixture agitated. The mother liquor will remain of constant composition and concentration, and as evaporation proceeds further, the anhydrous caustic potash crystals will precipitate out. These, coated and protected by the hexachlorbenzene, may be withdrawn and used with the coating, or they may be removed, as the caustic soda is in Example 1.

EXAMPLE 5

100 parts of 50% caustic potash solution is mixed with 100 to 200 parts of a mixture of tetrachlorbenzene, pentachlorbenzene, and hexachlorbenzene in a still fitted with an agitator. Agitation is started and the still is heated.

Distillation starts at about 370° F. and the temperature gradually increases to about 530°–538° F., by which time the equilibrium concentration of 86%—or slightly above—will have been reached.

Any further concentration, without a material increase in the temperature, produces a precipitation of anhydrous potash crystals, which, because of the agitation and the fact that they have to pass through the heavy diluent, will be coated with it, and may be progressively removed while progressive evaporation continues.

The crystals may be used in the coated form or the coating may be removed by washing with low boiling solvents, as mentioned in Example 1, in connection with caustic soda.

Since certain changes in carrying out the above process, and certain modifications in the composition which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. The process of producing finely divided free flowing anhydrous particles of caustic alkali without corrosion of the equipment and free from contamination of the mother liquor, which comprises evaporating a solution of the caustic alkali to a point where further concentration results in the precipitation of anhydrous caustic alkali, further evaporating the solution with agitation in the presence of a water-immiscible diluent which is inert to caustic alkali and slightly higher in density than the mother liquor whereby progressive evaporation and precipitation occur and the higher density of the diluent results in separation of the mother liquor from the precipitated alkali and the diluent forms a coating around the particles, and removing the said coated particles together with the diluent.

2. The process of producing anhydrous granular free flowing caustic alkali without corrosion of the equipment and free from contamination of the mother liquor, which comprises evaporating a solution of the caustic alkali to a point where further concentration results in the precipitation of particles of the anhydrous caustic alkali, the temperature at this point being above the melting point of the monohydrate and below that of the anhydrous product, further evaporating the solution with agitation in the presence of a water-immiscible diluent which is inert to caustic alkali and higher in density than the mother liquor, whereby precipitation of the caustic alkali is progressively carried on and the granules of caustic alkali are separated from the mother liquor because of the higher density of the diluent and are coated with the diluent, and progressively removing the diluent together with the coated granules.

3. The process of producing free flowing particles of anhydrous caustic alkali which comprises precipitating anhydrous particles from a solution of caustic alkali in the presence of a compound which is heavier than the mother liquor, so that the mother liquor floats thereupon, and is immiscible with the caustic solution and substantially inert to said caustic alkali.

4. The process of producing finely divided anhydrous crystals of caustic alkali which comprises evaporating a solution of said caustic alkali to cause precipitation of anhydrous crystals of the alkali, and coating each of said crystals as it is formed with a water-immiscible compound which is at least a little heavier than the caustic alkali solution at the concentration at which precipitation occurs and is inert to said caustic alkali by maintaining said compound in the presence of said crystals as they are precipitated.

5. The process of producing finely divided anhydrous crystals of caustic alkali which comprises evaporating an aqueous solution of said caustic alkali to cause precipitation of caustic alkali crystals, and coating each of said crystals as it is formed with an organic halogen compound which has a greater density than the caustic alkali solution at the concentration at which precipitation occurs by bringing said crystals into contact with said compound as soon as they are precipitated.

6. The process of continuously producing free flowing anhydrous particles of caustic alkali which comprises continuously passing a stream of a solution of caustic alkali through heated vapor of a compound which is immiscible with water, substantially inert to said caustic alkali, and has a greater density when in liquid form than the equilibrium solution of said caustic alkali and a vapor pressure which is substantially equal to the difference between the external pressure and the vapor pressure of said equilibrium solution, and for a period of time such that the concentration of said caustic solution when it has passed through said vapor will be brought to the equilibrium point at which precipitation of anhydrous particles of said caustic alkali will occur, whereby said vapor is condensed into said compound and mingles with said solution; collecting and retaining a predetermined amount of said solution and compound and cooling said retained portion, whereby precipitation of anhydrous particles of caustic alkali takes place and said anhydrous particles together with said compound sink below said caustic solution and said anhydrous particles are coated with said compound; withdrawing caustic solution from said retained portion so as to maintain the amount of said retained solution within a predetermined range; withdrawing said compound together with said coated anhydrous particles of caustic alkali, so as to maintain the amount of said retained compound within a predetermined range; and subsequently removing a predetermined amount of said compound from said anhydrous caustic alkali particles.

7. The process of continuously producing finely divided anhydrous crystals of caustic alkali from a solution of caustic alkali which comprises continuously feeding said solution into the upper end of a column still; continuously feeding into the bottom of said column still the vapor of a compound which is immiscible with water, substantially inert to the caustic alkali, has a greater density when in liquid form than the equilibrium solution of said caustic alkali, and has a vapor pressure at operating temperatures which is substantially equal to the difference between the external pressure and the vapor pressure of said solution, whereby the said vapor travels upwardly past the downwardly flowing caustic solution and said solution is progressively evaporated, the flow of said caustic solution and said vapor being so regulated that said caustic solution will reach equilibrium near the lower end of said still; condensing the vapors passing out of the upper end of said still; separating said compound which has been so condensed from the distillate; returning said compound to said still; retaining a portion of said solution and said compound at the lower end of said still and cooling said retained portion, whereby anhydrous crystals of caustic alkali will be precipitated and will settle to the bottom of said still together with said compound, said crystals being entirely surrounded by said compound; continuously removing the excess caustic solution from the lower end of said still, so as to maintain a predetermined quantity of said solution therein; continuously removing said compound together with said precipitated and coated crystals of caustic alkali from the lower end of said still, so as to maintain a predetermined quantity of said compound therein; and removing a predetermined amount of said compound from said anhydrous crystals.

8. The process of continuously producing free flowing particles of caustic alkali which comprises continuously feeding a solution of caustic alkali into the top of a column still; continuously feeding into the lower end of said column still the vapor of a halogen compound which is immiscible with water, inert to the caustic alkali, has a greater density in its liquid form than the equilibrium solution of said caustic alkali, and which has a vapor pressure at operating temperatures equal substantially to the difference between the external pressure and the vapor pressure of said equilibrium solution, whereby the vapor contacts with the caustic alkali solution, and said solution is evaporated as it passes downwardly through said still, the flow of said solution being such that said solution will reach equilibrium at a point near the lower end of the still; continuously condensing the vapors passing out of the upper end of said still; separating said halogen compound from the condensate; returning said halogen compound to said still; collecting said halogen compound in the bottom of said still together with the equilibrium caustic alkali solution; cooling said caustic alkali solution so collected whereby precipitation of anhydrous particles of caustic alkali will take place and said anhydrous particles will sink to the bottom together with said compound and become coated with said compound; removing said caustic alkali solution in such a manner as to maintain a predetermined quantity thereof at the bottom of said still; removing said halogen compound together with anhydrous particles of said caustic alkali in such a manner as to maintain a predetermined quantity of said halogen compound at the bottom of said still; and removing a predetermined amount of said compound from said anhydrous caustic alkali particles.

VAMAN R. KOKATNUR.